June 3, 1930.   F. W. LYLE   1,761,635
ELECTRICAL APPARATUS
Filed March 19, 1923
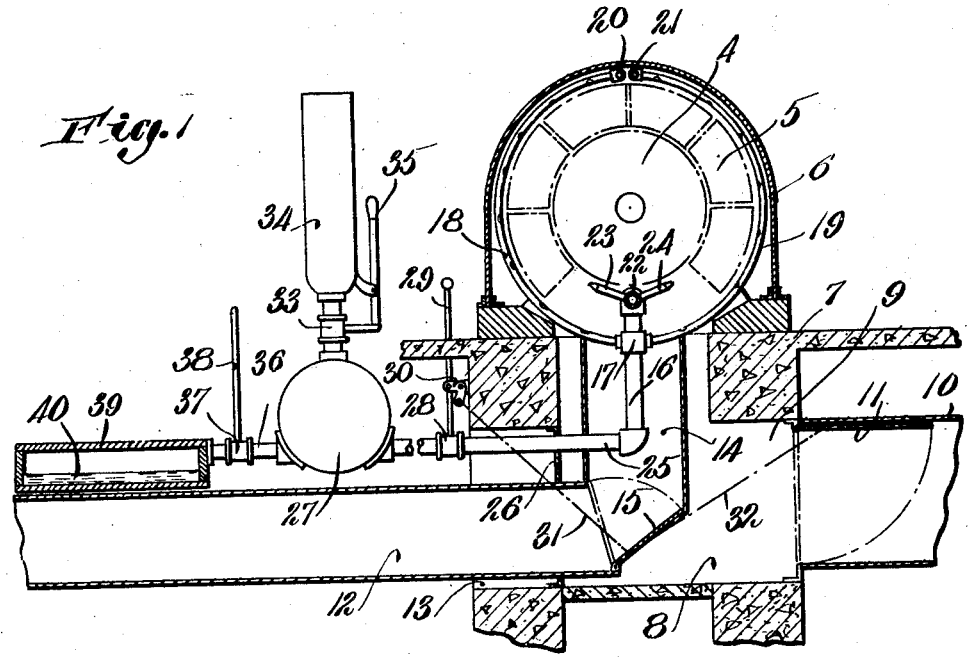
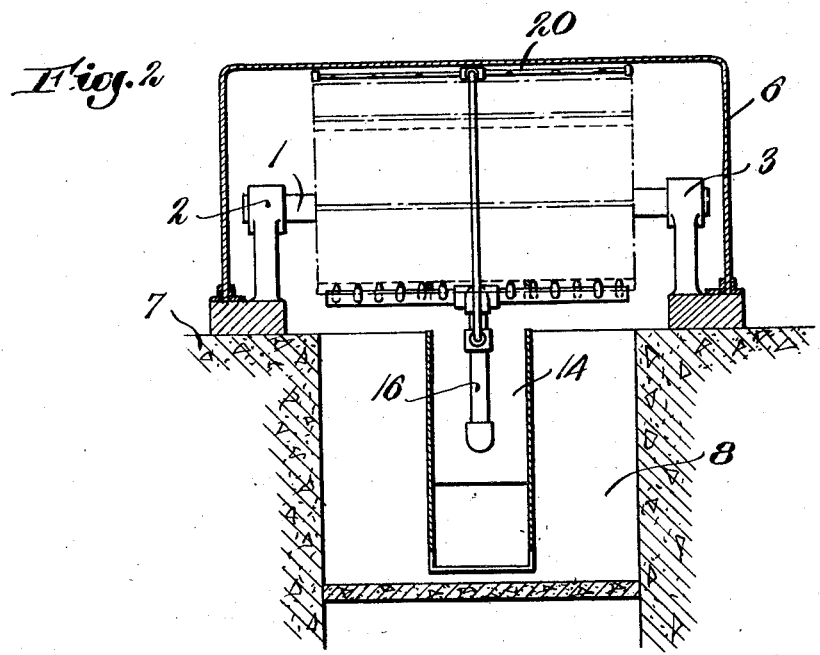
Inventor
Frederick W. Lyle
by Roberts, Roberts & Cushman
Attorneys Patented June 3, 1930

1,761,635

UNITED STATES PATENT OFFICE

FREDERICK W. LYLE, OF WALTHAM, MASSACHUSETTS, ASSIGNOR TO BEACON ACCESSORIES CORPORATION, A CORPORATION OF MASSACHUSETTS

ELECTRICAL APPARATUS

Application filed March 19, 1923. Serial No. 625,936.

This invention concerns electrical apparatus and relates more particularly to a process of and means for extinguishing fires occurring in such apparatus.

Electrical devices, particularly dynamo electrical machinery, including motors and dynamos, are prone to heat up under certain operating conditions, as for example overload or short circuit in the line. This heating, if continued, decreases the dielectric strength of the insulating material until the latter is punctured by the current and fire ensues. The application of usual extinguishing media, such as water or chemical solutions, is almost as ruinous to such apparatus as the fire itself and for this reason the larger installations of electrical machinery are commonly provided with air circulating means intended to keep the temperature of parts below the point at which damage to the insulation would begin.

While to a certain extent effective, such prior arrangements do not by any means furnish absolute assurance against fire and the principal object of the present invention is to provide a process and apparatus by the use of which it is possible quickly to extinguish fires in electrical machinery and rapidly to cool the heated parts without further damaging the mechanism in any manner.

In the accompanying drawings one desirable apparatus useful in performing my improved process is illustrated and in such drawings, Fig. 1 is a vertical section transversely through the shaft of a dynamo electrical machine of substantially usual type showing the present improvements applied thereto, certain parts being shown in elevation and certain parts being broken away; and Fig. 2 is a vertical section at right angles to the section of Fig. 1, and substantially through the axis of the electrical device.

In the drawings an electrical device of usual form, such for example as a dynamo, is illustrated. This device comprises a shaft 1 mounted in bearings 2, 3, a rotor 4 mounted on the shaft, and a stator 5 suitably supported by the machine frame. As the structural details of the electrical apparatus form no part of the present invention such apparatus has been shown in a diagrammatic manner.

A substantially air tight casing or housing 6 surrounds the electrical apparatus, conforming closely to its outer peripheral surface but providing an enclosed space at its opposite ends. The electrical device with the casing rests upon a foundation 7 provided with a pit or chamber 8 immediately beneath the electrical device and communicating with the interior of the housing 6. This pit has an offset 9 at one side for the reception of the end of an exhaust conduit 10. The entrance to this conduit is controlled by the normally open valve 11. An inlet conduit 12 enters the pit 8 through a second offset opening 13 and this inlet conduit is continued upwardly in a vertical portion 14 which terminates just below the outer periphery of the electrical device at a point substantially central of the length of the shaft 1. A valve 15, which normally stands open, is arranged within the conduit 12 for controlling the flow of air therethrough.

The parts above described are of a type commonly employed in connection with large installations of dynamo electric machinery with the purpose of keeping the insulation and other portions of the electrical device reasonably cool by the circulation of air through the casing 6. This circulation can be induced merely by the rotation of the usual parts of the rotor but is sometimes augmented by the provision of special fan elements moving with the rotor. With such an arrangement fresh air enters through the inlet 12 and after circulating about the casing 6 in contact with the electrical apparatus is discharged through the ends of the casing into the pit and thence exhausted through the conduit 10.

In accordance with the present invention a pipe or conduit 16 is disposed within the vertical portion 14 of the inlet pipe 12 and is provided at its upper part with a transversely extending header 17. Branch pipes 18, 19 extend upwardly from this header in close proximity to the outer surface of the stator and terminate in headers 20, 21 respectively at the upper part of the casing and within the latter. The pipes 18, 19 and the headers 20, 21 respectively are provided with series of delivery openings or nozzles adapted to direct streams of fluid radially toward the axis of the rotor. Above the header 17 a second header 22 is provided which extends substantially parallel to the axis of the rotor and which is provided with divergent series of nozzles 23, 24 so disposed as to deliver streams of fluid into the space between the rotor and the stator.

The lower end of the pipe 16 is connected with a substantially horizontal pipe 25 extending out through a diaphragm 26 in the opening 13 to an expansion tank or chamber 27, and a valve 28 is interposed in the pipe 25 for controlling the flow of fluid therethrough. This valve is actuated by a lever handle 29 and is connected to the valves 11 and 15 previously described by suitable connections diagrammatically indicated at 30, 31 and 32 in such manner that when the valve 28 is opened the valves 11 and 15 are closed and vice versa.

The tank 27 is intended normally to contain gas under pressure and is provided with a valved header 33 having provision for attaching thereto a gas tank or tanks 34 of usual commercial type in which liquefied gas under pressure is sold and from which the gas in tank 27 may be replenished. The valve in the header 33 is controllable by a lever 35. Additional or alternative means for replenishing tank 27 comprises a pipe 36 extending from the expansion tank 27 and provided with a controlling valve 37 actuable by a lever handle 38. The pipe 36 communicates with the upper part of a closed receptacle 39 which is shallow and of relatively large horizontal area. This receptacle is intended to receive a liquefied gas indicated at 40 and to provide a large evaporative surface for the liquid so that the latter may rapidly be converted into gas for transmission through the pipe 36 for replenishing the expansion tank 27.

With the arrangements described liquefied gas from the tank 34 may be permitted directly to enter the expansion chamber 27 where it rapidly expands to gaseous condition. During such expansion the gas is cooled to a very material extent and from this tank the cooled gas is delivered through the pipes 25 and 16 to the interior of the housing 6, where it is further expanded and cooled.

In the normal position of the parts the valve 28 is closed and the valves 11 and 15 are open. Atmospheric air enters through the conduit 12, circulates through the casing, and serves to cool the parts of the electrical machine to the desired extent. If, however, for any reason, as for example through overload, the machine heats up so rapidly that the cooling effect of air is insufficient and the insulation takes fire, the operator upon noting this fact, immediately moves the lever 29 to shut the valves 11 and 15 and open the valve 28. As the contents of the tank 27 is depleted, the operator actuates one of the levers 35 or 38 to admit liquid gas or gas in gaseous condition into the tank 27. From the tank 27 the gas flows under pressure and is discharged through the series of nozzles within the casing 6.

A suitable gas for the purpose is carbon dioxide, although other gases which hinder or prevent combustion may be substituted therefor if desired. The admission of such a gas to the housing 6 and its circulation therein immediately extinguishes the fire as the gas penetrates to the interstices of the windings much more quickly than water or other liquid would do and without in any manner damaging the insulation or other parts of the mechanism. Moreover, as the gas enters the casing at a very low temperature it rapidly cools the heated parts of the apparatus so that the softened insulating material is quickly restored to normal condition and further damage to the mechanism is checked.

As soon as the fire is extinguished the valve at 28 is closed and the circulation of air in the apparatus may be resumed, thus discharging the gas employed from the casing so that upon removing the casing or housing for making the necessary repairs no ill effects will be experienced from the presence of the fire extinguishing gas employed.

While the above described process and apparatus is particularly intended for extinguishing fires, it is evident that if desired, a continuous or intermittent supply of a gaseous refrigerant may be admitted to the housing to reduce the temperature therein, either as an auxiliary to the usual air cooling means or as a substitute therefor.

I claim:

1. That process of safeguarding against fire hazards electrical apparatus insulated by material which melts above the normal operating temperature of said apparatus which comprises discharging into direct heat exchanging relation to said material only upon occurrence of temperatures causing destruction of said insulating material a gas which is incombustible and a non-supporter of combustion cooled below room temperature.

2. That process of protecting electrical apparatus having insulated windings normally cooled by a stream of air against destruction by excess of heat, which comprises circulating substantially dry carbon dioxide at a temperature materially below room temperature through the apparatus in intimate contact with the insulation of said windings.

3. That process of extinguishing fire and reducing the temperature in electrical apparatus having insulated windings which comprises admitting a gaseous refrigerant which is incombustible and is not a supporter of combustion to direct heat-exchanging relation to said windings.

4. Apparatus of the class described comprising a housing for an electrical device having insulated windings, delivery nozzles in direct proximity to said windings, and control means for supplying said nozzles with substantially dry carbon dioxide gas at a temperature materially below room temperature.

5. Apparatus of the class described comprising a housing for an electrical device having windings insulated by a material which melts above room temperature and is normally cooled by air, and means for delivering into direct heat-exchanging relation with said windings only upon occurrence of destructive temperature in parts thereof substantially dry carbon dioxide at a temperature materially below room temperature.

6. The combination with electrical apparatus insulated by material which melts above room temperature and is normally cooled by gas of one inlet temperature of means for delivering to said apparatus a gas cooled below said inlet temperature and which is substantially inert chemically to said material at the ignition temperature thereof.

7. The combination with electrical apparatus having insulation normally cooled by air, of means for delivering to said apparatus directly after expansion a gas, which is substantially inert to said insulation at the ignition temperature thereof.

8. That process of protecting, against destruction by excess of heat, electrical apparatus having insulated windings normally cooled by a gas having one inlet temperature which comprises flooding said windings with a gas at a materially lower inlet temperature, said last-named gas being substantially inert to said windings at the ignition temperature thereof.

Signed by me at Boston, Massachusetts, this 16th day of March, 1923.

FREDERICK W. LYLE.